Patented Oct. 4, 1938

2,132,243

UNITED STATES PATENT OFFICE 2,132,243

METHOD OF PREPARING A CASEIN PAINT

Arnold J. Menaker, Chicago, Ill., assignor, by mesne assignments, to Atlantic Research Associates, Inc., a corporation of Delaware No Drawing. Application April 22, 1935,
Serial No. 17,741

2 Claims. (Cl. 134—50)

This invention relates to a casein paint, and particularly to a method of incorporating lithopone therein as a pigment.

Lithopone has heretofore been widely used as a pigment in casein and other paints. Lithopone, which consists of a mixture of barium sulfate, zinc sulfide, with or without zinc oxide, is ordinarily supplied in the form of a white powder. In the manufacturing process, this powder is produced by grinding very thoroughly and very greatly, at a great expense, the material known as pulp lithopone or high strength lithopone, after it has been dried. The pulp lithopone is the product of the interaction of zinc sulfate and barium sulfide, which has been heated and thrown into cold water and removed therefrom while hot and ground while wet. It is made into lithopone by drying, and subsequently carefully grinding.

It has now been discovered that this wet pulp material may be readily incorporated into a casein water paint, and at the same time will produce a finished product having every desirable characteristic of the thoroughly ground and much more expensive lithopone.

In accordance with this invention, the pulp lithopone is introduced into the casein paint at a stage after water has been aded to the casein. It is preferred that all dry ingredients of the casein paint may be mixed in dry form, and then added to water. When this process is followed, the lithopone is preferably added at a stage when the major portion of the powders have been incorporated in the water.

As an example of the invention, 24½ pounds of a casein solvent such as borax, 6½ pounds of ammonium oxalate, 16 pounds of sodium fluoride, 940 pounds of talc, and 55 pounds of water or air-floated mica are mixed in dry state until thoroughly dispersed. The mixture is then incorporated in about 75 gallons of water heated to about 180 degrees F. A temperature of 180 to 200 degrees F. is maintained in the water while the ingredients are being added and until the solution of the casein is substantially complete. When about two-thirds of the dry powders have been incorporated, 1020 pounds of commercial pulp lithopone are fed in with the remainder of the powders. Colored pigments, where desired, may be added, either in the dry powders, or to the wet mixture. The paste is then mixed for approximately one hour, becoming a smooth, semi-liquid paste, which does not require any grinding. Where an oil emulsion is desired, the oils may be added at this time, and as described in my co-pending application, Serial No. 17,742 filed April 22, 1935 it is preferred to use oils having an acid number less than 1.0. With the proportions above given, 2½ gallons of neutral pine oil and 2½ gallons of linseed oil, preferably having an acid number of about .3, will produce a satisfactory emulsion for white paint. Where colored pigments have likewise been introduced, it is generally preferred to use about 10 gallons of linseed oil. The oils are thoroughly mixed to produce a stable emulsion, and the product may then be filled into suitable containers. The product herein described is a paste which may be diluted by the addition of water to produce a brushing paint. For this purpose, about a half part of water may be added.

The pulp lithopone may, of course, be introduced at other stages than are designated herein, but it is preferred to prepare the paint in the manner herein specified.

The foregoing detailed description has been given for clearness of understanding only, and no unnecessary limitations should be understood therefrom, but the appended claims should be construed as broadly as permissible, in view of the prior art.

I claim:

1. A method of making casein paint which consists in first mixing in a dry state powdered casein with borax, ammonium oxalate, sodium fluoride, talc and mica, then incorporating the dry mixture into water heated to at least 180° F., introducing pulp lithopone into the solution before the addition of the casein has been completed, and then mixing the mass thoroughly to form a smooth, semi-liquid paste, requiring no grinding.

2. A method of making casein paint which consists in simultaneously introducing into water, casein, a solvent therefor, a filler and a pulp lithopone, permitting the casein to dissolve at a temperature of at least 180° F. and then mixing the mass thoroughly to form a smooth, semi-liquid paste, requiring no grinding.

ARNOLD J. MENAKER.